US009579623B2

(12) United States Patent
Cross

(10) Patent No.: US 9,579,623 B2
(45) Date of Patent: Feb. 28, 2017

(54) SPECIALIZED IMMOBILIZATION MEDIA

(71) Applicant: Kenneth W. Cross, Encinitas, CA (US)

(72) Inventor: Kenneth W. Cross, Encinitas, CA (US)

( * ) Notice: Subject to any disclaimer, the term of this patent is extended or adjusted under 35 U.S.C. 154(b) by 0 days.

(21) Appl. No.: 14/551,054

(22) Filed: Nov. 23, 2014

(65) Prior Publication Data

US 2015/0147244 A1 May 28, 2015

Related U.S. Application Data

(60) Provisional application No. 61/908,062, filed on Nov. 23, 2013.

(51) Int. Cl.
*B01J 19/00* (2006.01)
*B03C 1/00* (2006.01)
*B03C 1/02* (2006.01)
*B03C 1/025* (2006.01)
*B03C 1/031* (2006.01)
*B03C 1/04* (2006.01)
*B03C 1/08* (2006.01)
*B01D 35/06* (2006.01)

(52) U.S. Cl.
CPC ................. *B01J 19/0053* (2013.01)

(58) Field of Classification Search
CPC .......... B01J 19/00; B01J 19/0053; B03C 1/00–1/005; B03C 1/02–1/025; B03C 1/031; B03C 1/04; B03C 1/08; B01D 35/06
See application file for complete search history.

(56) References Cited

U.S. PATENT DOCUMENTS

| | | | |
|---|---|---|---|
| 3,627,678 A | 12/1971 | Marston et al. | |
| 3,676,337 A | 7/1972 | Kolm | |
| 4,190,524 A * | 2/1980 | Watson | B03C 1/034 209/213 |
| 4,201,827 A | 5/1980 | Heitkamp | |
| 4,309,290 A | 1/1982 | Heitkamp | |
| 4,314,905 A | 2/1982 | Etzel et al. | |
| 4,352,730 A | 10/1982 | Dijkhuis | |
| 4,668,383 A | 5/1987 | Watson | |
| 5,254,231 A | 10/1993 | Heath et al. | |
| 5,547,585 A | 8/1996 | Shepherd et al. | |
| 6,150,181 A | 11/2000 | Halbreich et al. | |
| 6,248,235 B1 | 6/2001 | Scott | |
| 6,274,049 B1 | 8/2001 | Scott | |
| 6,330,947 B1 | 12/2001 | Scott | |
| 6,508,367 B2 | 1/2003 | Scott | |
| 6,524,457 B1 | 2/2003 | Scott | |
| 6,632,897 B1 | 10/2003 | Geiter et al. | |
| 6,706,178 B2 * | 3/2004 | Simonson | B03C 1/286 210/222 |
| 6,830,694 B2 | 12/2004 | Schiestel et al. | |

(Continued)

FOREIGN PATENT DOCUMENTS

DE 102010040826 A1 * 3/2012 ............. B82Y 30/00

*Primary Examiner* — Natasha Young

(57) ABSTRACT

A genre of media is presented for use with a reactor vessel and for the purpose of immobilizing small particles, often catalytic in nature. The media can include a number of ferromagnetic active wafers stacked together and separated by non-ferromagnetic separator portions, such that when in the presence of a magnetic field and magnetic-particle-containing fluid, at least some of the gaps between active wafers captures and suspends magnetic particles.

23 Claims, 17 Drawing Sheets

(56) References Cited

U.S. PATENT DOCUMENTS 7,371,327 B2 * 5/2008 Cross .................. B01J 8/06
  204/155
8,366,937 B2 * 2/2013 Cross .................. B01J 8/06
  204/155

* cited by examiner

SPECIALIZED IMMOBILIZATION MEDIA

RELATED APPLICATIONS

This application claims the benefit of priority from U.S. Provisional Patent Application Serial No. 61/908,062, entitled "Specialized Immobilization Media" and filed on Nov. 23, 2013, which is fully incorporated herein by reference for all purposes and to the extent not inconsistent with this application.

BACKGROUND

The disclosure is directed to a genre of media for use within a reactor vessel and for the purpose of immobilizing small particles, often catalytic in nature.

DETAILED DESCRIPTION

Figure 1:
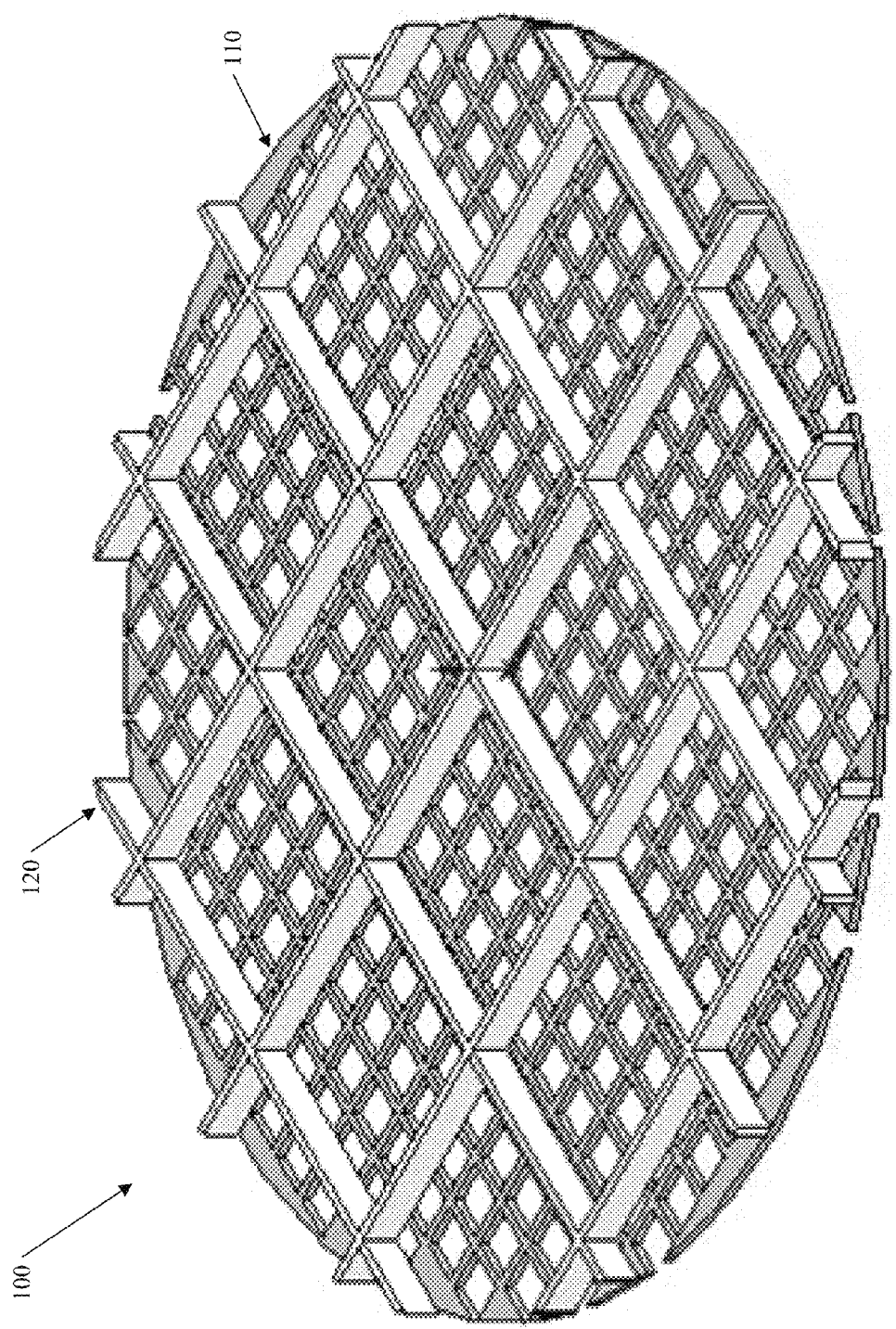
FIG. 1 illustrates an exemplary repeatable media stack segment, showing one active wafer layer and one spacer or separator piece according to certain embodiments.

The following detailed description is directed to certain sample embodiments. However, the disclosure can be embodied in a multitude of different ways as defined and covered by the claims. In this description, reference is made to the drawings wherein like parts are designated with like numerals throughout.

Media Environment Introduction

In certain embodiments, a genre of media for use within a reactor vessel and for the purpose of immobilizing small particles, often catalytic in nature. Such a reactor vessel can be as disclosed in U.S. Pat. Nos. 8,366,937 and/or 7,371,327, which are commonly-owned and fully incorporated herein by reference for all purposes and to the extent not inconsistent with this application. However, for a better understanding of the context of this application, the following is a summary of the reactor vessel.

In certain embodiments a high-efficiency, Nano-catalyst immobilization (HENCI) reactor (not shown) may be used with the media of this application to immobilize or fix-in-place small chemical catalyst particles, including but not limited to metallic Nano-particles (MNPs). The reactor can include the immobilization or fixation of MNPs by building and configuring a chemical reactor to also include one or more electromagnets or permanent magnets (and possibly both), wherein a portion of the magnetic circuit includes open space; i.e., the portion of the magnetic circuit that is not occupied by, or made of, a solid mass and where the magnetic field is highly concentrated to serve the function of the reactor device as in, for example, the open part of a lifting electromagnet or the open space between the two ends of a standard, horseshoe permanent magnet. The open portion of the magnetic circuit of the reactor is also the chemical reaction zone within the magnet/reactor body, and can be at least partially occupied with a media or media stack as disclosed in this application.

The media can be a high surface-area, high permeability, magnetic matrix structure, including any stacked matrix structure with a low specific flow-resistance as disclosed in this application (i.e., for any fluid density and viscosity, change in pressure (Ap, or delta-p)/gallons per minute (GPM)/cross-sectional area (Axs)/unit reactor length). Generally, this means that the media or active wafers are designed to have as much surface area as possible (or as design-practical) and to take up as little of the cross-sectional area of the reactor tube or vessel as possible (or as design-practical). It also means that the spacer piece or pieces can be designed to perform their function (i.e., creating space between a consecutive pair of active wafers) while taking-up as little of the cross-sectional area of the reactor tube or vessel as possible or as design-required, given the mechanical and hydrodynamic constraints of the reactor, process configuration, and properties of the fluids within the reactor, such as density and viscosity. Details of the media and media stack are provided elsewhere in this application.

In certain embodiments, the media stack can be designed to create, within the reaction zone of the reactor, a multitude of places where the magnetic field flux lines must be cross the interface between a high (or higher) relative magnetic permeability (MP) material (e.g., such as the material from which the active wafer(s) is made) and a low (or lower) relative magnetic permeability (MP) material (e.g., such as the reactant fluid(s) being consumed or product fluid(s)

being created within the reactor) and/or vice versa. In certain embodiments, for example, a large number of these sequential strings or stacked occurrences or strings of these two types of interfaces can be created. These sequential strings are where, for example, the magnetic catalytic particles (MNPs) will "go to" (e.g., to where they will be attracted or drawn) when the magnetic field is applied across the media stack. Thus, the homogeneity (and immobilization density) of the resulting distribution of MNPs within a magnetically-dispersed, small-particle catalysis (MDSPC) chemical reactor or sorption unit (e.g., as described, for example, in at least one of U.S. Pat. Nos. 8,366,937 and/or 7,371,327) can be thought of as being, and in practice may be, proportional in magnitude to the homogeneity (and immobilization density) of the high-MP to low-MP, and low-MP to high-MP, interfaces created by the media stack, which is largely a function of the stack's three-dimensional morphology.

The media can be located directly in the flow path and reaction zone of the reactor, which constitutes the "open-for-magnetic-work" zone of the reactor vessel. Thus the particles (catalytic or otherwise) are immobilized onto/within the media and/or media stack because they are subjected directly to the magnetic field as the flux lines flow through the "open-for-magnetic-work" section of the magnetic circuit (note that the remaining portions of the magnetic circuit are comprised materials that have a high magnetic permeability relative to the "open-for-magnetic-work" section of the circuit, and thus conduct magnetic flux readily, or more readily than some or all of the material occupying the "open-for-magnetic-work" section). The media can be comprised of many long intertwined fibers or strands as in the shape of steel wool, as mentioned in U.S. Pat. Nos. 8,366,937 and/or 7,371,327, or, as disclosed in more detail later, a woven material (e.g., a cloth-like weave) compressed together and thus in intermittent and intimate contact with each other. Other stranded-media configurations are also possible and meant to be included within the scope of this disclosure.

Amorphous on a macro-scale, the media can include individual strands acting individually on a micro scale, and the magnetic flux lines can be directed through the tortuous paths of the media due to its magnetic permeability being greater than that of the process fluid. The magnetic flux lines, however, are not constrained to follow just one strand. When a strand's path brings it to one of the potentially many points where it contacts another strand, the flux line will continue along whichever strand happens to be best aligned (axially) with the direction of the magnetic field at that point. Often, the magnetic flux lines will jump from one media strand to another media strand, sometimes within the same media layer and frequently between media layers. When doing this jump, the flux lines must first leave the metal of the first strand and enter the surrounding environment (e.g., in the case of an operating reactor vessel, the process fluid containing the chemical catalyst particles); then enter the other strand. Both of these events (e.g., lines of flux crossing the interfaces between high- and low-permeability materials, in either direction) create areas where the MNPs can be immobilized.

As mentioned, as each flux line is "forced" to leave the high-permeability metal of a wafer and travel or jump (e.g., approximately axially) through the low-permeability process fluid within the reactor, two areas of potential particle-immobilization (i.e., magnetic attraction of the chemical catalyst particles to the surface of the wafer) are created: one where each flux line leaves the surface of a wafer and the other where each flux line enters the surface of a wafer. As disclosed in further detail elsewhere in this application, these phenomena are better-exploited in the new genre of media, which is called a stacked media. These media stacks are fundamentally different than the continuous (or steel-wool type) media, since they are designed with multiple active wafers stacked on top of each other, but separated by some means (disclosed elsewhere this application) such that there exists at least some space between at least a portion of each adjacently-stacked active wafer. The media stack is then inserted within the reactor vessel such that the general plane of each wafer layer is approximately orthogonal to the general flow direction of the process fluid and approximately orthogonal to the background direction of the magnetic flux lines (i.e., the direction of the flux lines without a media stack in the vessel).

This orientation of the media stack and the layered separation of the media stack help to ensure that a large number of flux lines will jump between (i.e., enter and leave) the multiple media layers in multiple locations on each layer. Thus, a very large number of potential particle-immobilization areas are created, at which little stalactites and stalagmites can form between the various wafer layers as the particles are immobilized. These immobilization areas can potentially meet and form bridges between wafer layers. The total number of particles that can be immobilized per unit reactor volume, and the total surface area of catalyst available to the reactants per unit reactor volume can be greatly multiplied compared to other systems and dispersed approximately homogeneously throughout the open area of the magnetic circuit/reaction zone of the reactor. Thus, the number of nanoparticles that may be held in place (i.e., immobilized) per unit reactor volume can be high enough to take advantage of the ultra-high catalytic ability per unit mass of a catalyst material that can be fashioned into small particles (down to nanometer sizes, or smaller).

This dispersed-particle catalytic bed technology (see, e.g., U.S. Pat. Nos. 8,366,937 and/or 7,371,327) is notable because, by employing the magnetic field tensor (e.g., created by the combination of a magnetic and the media) to immobilize the catalyst particles within the reactor (i.e., even under relatively high flow forces), orders of magnitude more particles per unit reactor volume can be immobilized, and there is no need to use zeolites, Nano-cages, binders, adhesives, etc. to hold the catalyst particles onto the support matrices in order to expose the entire, or nearly the entire, surface area of each active wafer to the reactant fluid flow.

Media Detail Description

Certain embodiments of the invention provide a media for use within reactor vessel, including for example, the reactor vessel(s) described in U.S. Pat. Nos. 8,366,937 and/or 7,371,327, which have in industrial practice come to be known as the dispersed-particle catalytic bed reactor, or DPCB reactor.

FIG. 1 illustrates an exemplary repeatable media stack segment 100, showing one active wafer 110 and one spacer or separator piece 120 according to certain embodiments. The active wafer and spacer will be discussed in further detail below, as will media stack segment 100. However, for now, it is worth noting that it will become evident to those skilled in the art that separator piece 120 may not need to be included, but other means may be used to provide the disclosed separation. For example, it may be possible to affix each active wafer to the reactor wall at a certain distance (e.g., distances may be the same or varied) from its neighbor with the use of slots machined into the reactor wall, or shelves added to the wall. Alternately, with the appropriate machining or manufacturing process, non-magnetic vertical legs might be made part of active wafer 110 for providing separation between multiple active wafers 110 of stack. This could eliminate the need for separator piece 120. For this leg-design, the legs could potentially be made of the same (magnetic) material as the wafer, but made very thin such that in operation the majority of the magnetic flux lines would not be able to flow through them even though they would carry flux. Put another way, thin legs would reach flux saturation (i.e., where they cannot carry more flux regardless of how much more magnetic field is applied), thereby ensuring that most of the magnetic flux would still jump between wafers, facilitating particle immobilization. Even though this disclosure provides for using separator piece 120, it is intended that the above-described slots, shelves, spacer-less leg-less and leg devices, used either in conjunction with separator piece 120 or as an alternative to it, will be covered by the scope of the claims.

In certain embodiments, active wafers are presented, which may be disc-shaped, or approximately disc-shaped, having a thickness and an approximately circular shape that makes up an wafer area, or wafer surface area. The active wafer disclosed herein can have, for example, a thickness of between approximately 0.01 mm and approximately 3.00 mm. However, thickness down to approximately 200 nm and up to approximately 1.00 cm can be feasible; and academically, the thickness need not be bounded by any minimum or maximum limit. Of course, the thinner the active wafers, the more wafers can fit into a given length of reactor vessel, and the better the overall immobilization performance (i.e., more wafers per length means more flux line jumps). However, the optimal design thickness of the active wafers can vary depending on various factors, which include the composition of the wafer material, the manufacturing technique used to make the wafer, the flow rate, density, viscosity, shear force, linear velocity, temperature and pressure of the particular reactant matrix material, the particle-size of the particles being immobilized, the size distribution of the particles being immobilized, and so on.

The active wafer disclosed herein can have, for example, a diameter of between approximately 0.5 inches and approximately 8.0 inches. However, circular diameters down to approximately 0.25 inches and up to approximately 5 feet can be feasible; and academically, the circular diameter need not be bounded by any minimum or maximum limit. However, worth noting from a practical design and operation standpoint, it may be more efficient to have multiple, smaller reactors working in parallel rather than one, large-diameter reactor. Even though there may be higher up-front manufacturing costs for the multiple parallel reactor system, the longer-term operating costs likely will be less over the lifetime of this system. Alternatively though, the active wafer may be a shape other than circular. For example the approximate shape of the wafer may be a square, a rectangle, a trapezoid, a parallelogram, a polygon, a rhombus, or any other shape needed for a particular application. Likewise, the active wafer need not be a flat shape, as previously disclosed, but may include shapes such as a cone, a hemisphere, a pyramid, or any other shape needed for a particular application.

Figure 2:
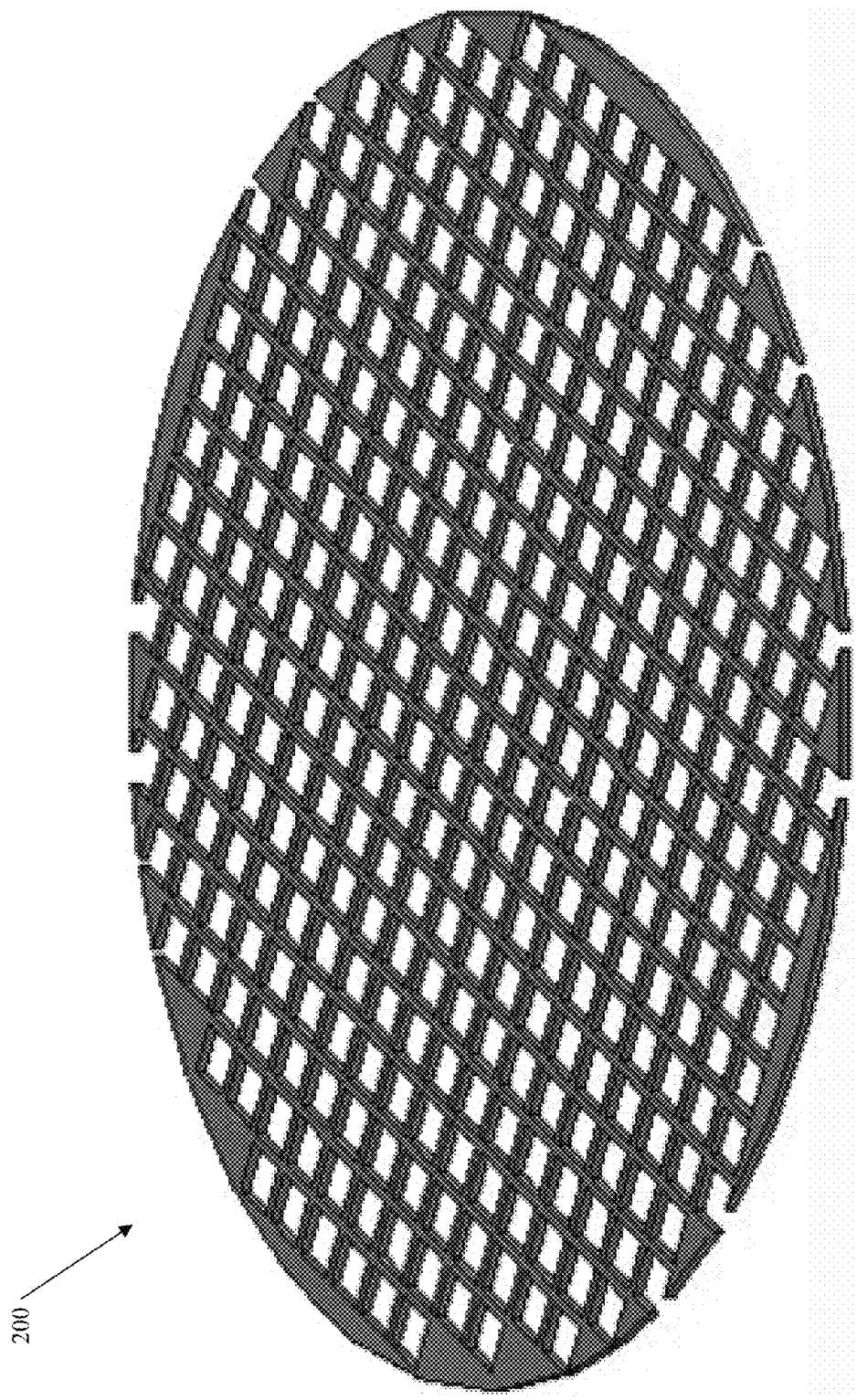
FIG. 2 illustrates an exemplary active wafer according to certain embodiments.

FIG. 2 illustrates an exemplary active wafer 200 according to certain embodiments. As shown in FIG. 2, active wafer 200 is made of perforated-plate instead of a stranded material, as disclosed elsewhere herein. Active wafer 200 can be made of any ferromagnetic material, or a combination of these materials, such as steel, cobalt, iron, nickel, Huesler alloys, and so on. However, depending on the chemical compatibility needed between the active wafer and the process fluid passing through the reactor vessel (e.g., if rust or other reaction might be an issue), then a certain choice may become obvious. For example, if working with an aqueous stream, magnetic 400-series stainless steels are a good combination of rust-resistance and low initial cost. Additionally, other alloys, oxides and chemical compounds might be used as well, such as nickel chromium oxide and ferrite. In certain embodiments, the percent open area of active wafer 200 (that is, the percent of the wafer area that is open and permits the reactor fluid to pass through it) may be large rather than small. The percent open area may be between approximately 25% and approximately 75%. However, depending on factors like those that help define wafer thickness, the percent open are may be as low as approximately 5% and as high as approximately 90%.

Figure 3:
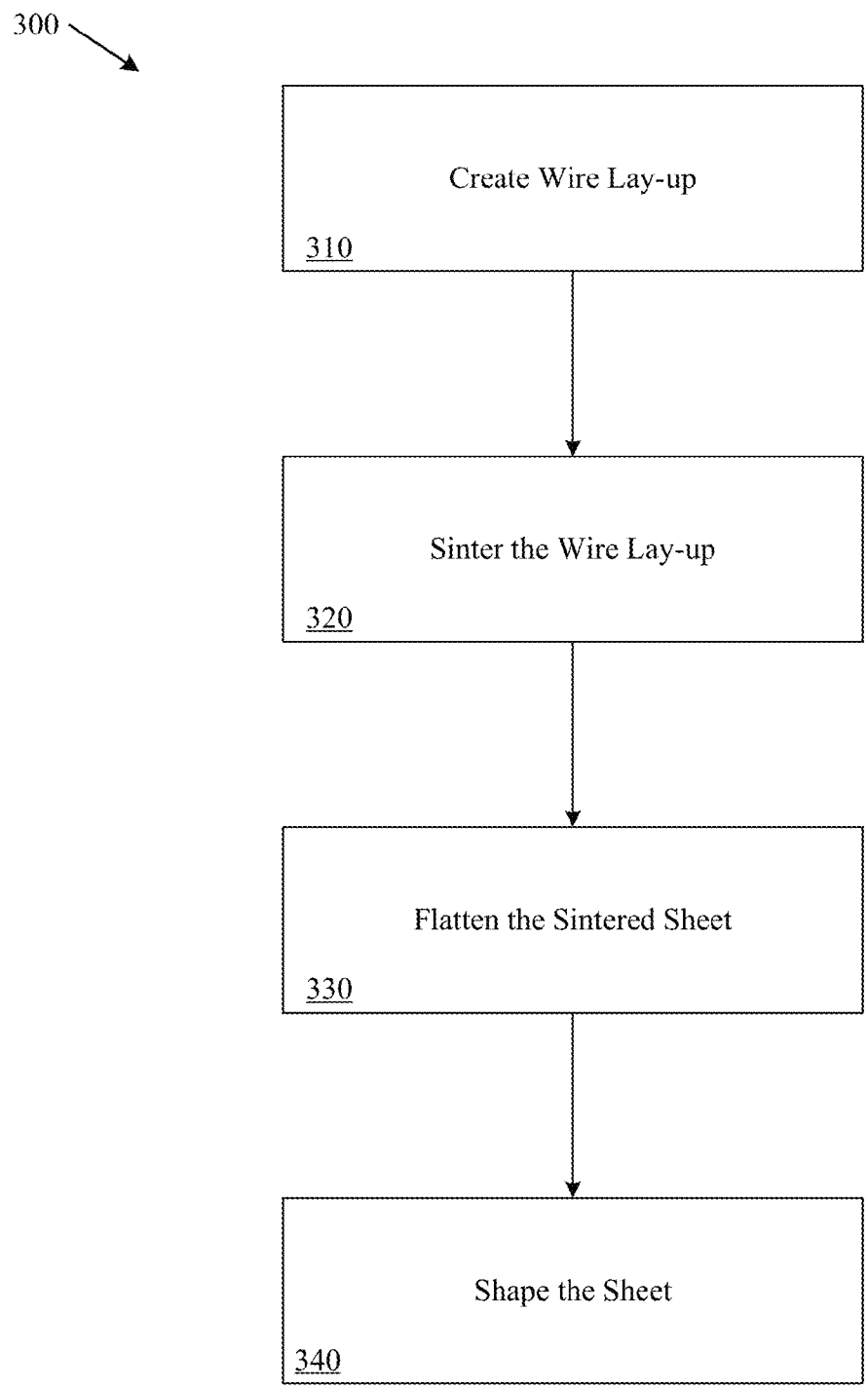
FIG. 3 illustrates an exemplary process for making the active wafer of FIG. 2 according to certain embodiments.

FIG. 3 illustrates an exemplary process 300 for making active wafer 200 according to certain embodiments. As shown in FIG. 3, at step 310, the production of active wafer 200 can start with a non-woven (or woven, if desired) wire lay-up, wherein the ferromagnetic strands are laid approximately flat on top of each other, first in one direction to create one layer of wire and second in a direction approximately 90 degrees to the first layer to create a second layer of wire (e.g., in some instances with only a two strand thickness overlapping). While the two-layer, approximate 90 degree lay-up will give the finished wafer the look of active wafer 200, it is intended that non-90 degree lay-ups are to be included within the scope of this application, as well as more than two-layer lay-ups. Then, at step 320, the wire lay-up can be sintered in a sintering oven to give the sintered sheet mechanical integrity, especially if the wire lay-up is not a woven mesh. Mechanical integrity is meant to include the integrity of the individual wires relative to each other and the integrity of the entire sintered sheet and/or finished wafer itself (i.e., the tendency of the wafer to flex, or not, under the force of process flow). After sintering (or before it), at step 330, the wire sheet can be calendared to flatten it out. Alternatively or in addition to calendaring, the sheet may be flattened by hammering, pressing or other flattening techniques. The flattening step can also include a smoothing process, such as electro-polishing, to facilitate the release of the immobilized particles when the magnetic field is removed or turned off. At step 340, the sintered and flattened sheet can be shaped using, for example, punch-cutting, into any required shape to make active wafer 200. Alternatively or in addition to punch-cutting, the sheet may be shaped using any type of shaping technique, like sawing or laser-cutting. Note that the steps presented herein can be performed in any order, and not necessarily the order discussed.

Figure 4:
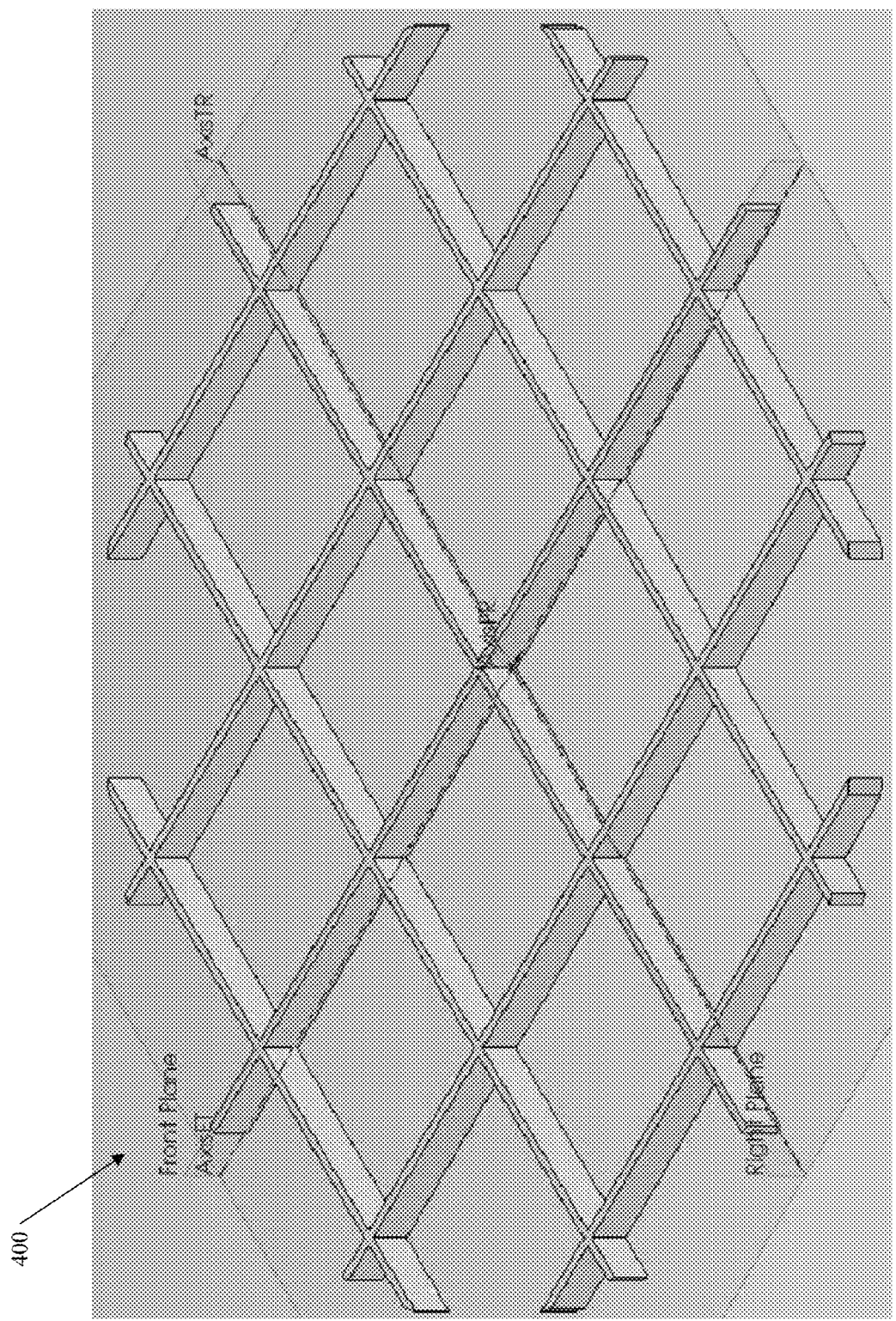
FIG. 4 illustrates an exemplary media spacer or separator piece according to certain embodiments.

FIG. 4 illustrates an exemplary media spacer or separator piece 400 according to certain embodiments. As shown in 4, separator piece 400 may be a shape and size that creates an approximate shape, or outline of a shape, that is similar to that of the wafer with which it may be used. For example, if the wafer has a disc shape, or is approximately disc shaped, then separator piece 400 may have a similar outlined shape (or be that shape itself). However, separator piece 400 need not have an outline that is the same or similar shape as the wafer, so long as it provides support and separation between stacked wafers, while presenting little to no impediment to the process fluid flow, any shape will suffice. Separator piece 400 is generally made into a more open pattern than the wafer; although this is not a requirement. Separator piece 400 can have a thickness of between approximately 0.001 mm and approximately 5.00 mm.

However, thickness down to approximately 200.00 nm and up to approximately 20.00 cm can be feasible; and academically, the thickness need not be bounded by any minimum or maximum limit. This thickness, and thus the separation between stacked wafers, can vary depending on various factors, which include the magnetic field strength developed in the reactor, the magnetic susceptibility of the particulate material (e.g., a catalyst) being immobilized, the designed distance needed between active wafers, the shear forces developed by the flow rate of the particular fluid moving through the reactor vessel, the particle-size of the particles being immobilized, the size distribution of the particles being immobilized, the area of each active wafer, and so on.

Separator piece 400 is constructed of a non-ferromagnetic material. Any such material can be used, such as non-magnetic metals (e.g., 300 series stainless steel, aluminum, brass, etc.), plastics (polypropylene, high-density polyethylene, polyoxymethylen, polytetrafluoroethylene, etc.), ceramics, glass, fiberglass, wood, and so on. However, the constraints of the system, such as the process fluid, process flow rate, structural stability desired, and so on may dictate one non-ferromagnetic material over another. As shown in FIG. 4, separator piece 400 is made into an open, square grid with an approximate circular outline to register against the circular cross-section of the reactor tube. Each beam of the grid can be approximately 0.50 mm wide and approximately 3.00 mm high. However, these numbers can vary as design constraints and system requirements might dictate.

Figure 5:
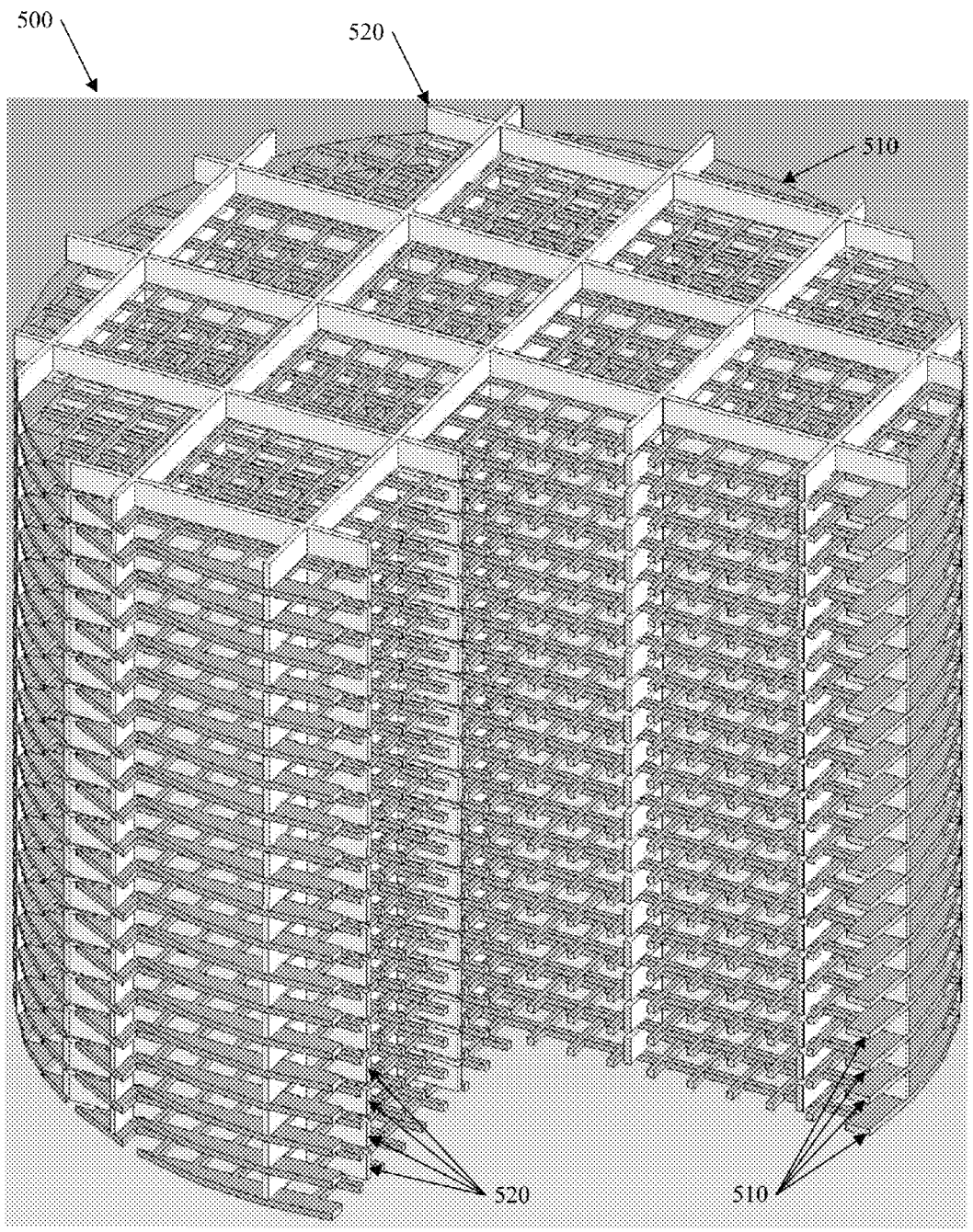
FIG. 5 illustrates an exemplary multi-layer media stack, showing multiple active wafer layers and multiple spacer or separator pieces according to certain embodiments.

FIG. 5 illustrates an exemplary multi-layer media stack 500, showing multiple active wafers 510 and multiple spacer or separator pieces 520 according to certain embodiments. As shown in FIG. 5, active wafers 510 can be similar to active wafer 200 and separator pieces 520 can be similar to separator piece 400. Media stack 500 can be used, as is, and installed directly into the reactor vessel as one stack. Or, each individual piece of media stack 500 can be loaded into the reactor vessel, one after the other. Or, media stack 500 can be affixed together (not shown) and inserted as a unit into the reactor vessel.

Figure 6:
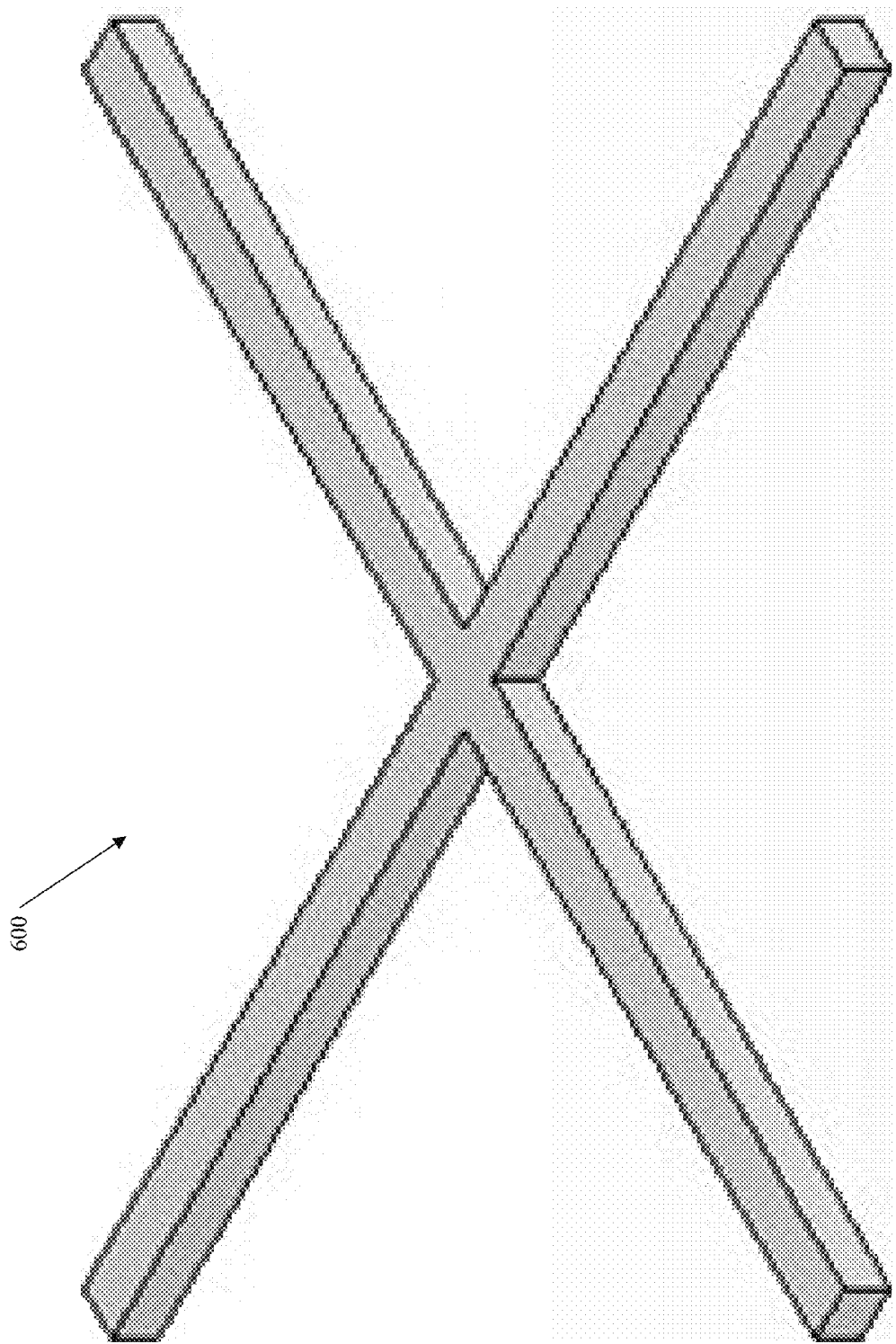
FIG. 6 illustrates an exemplary media spacer or separator piece according to certain embodiments.

FIG. 6 illustrates an exemplary media spacer or separator piece 600 according to certain embodiments. As shown in FIG. 6, separator piece 600 is similar in most every respect to separator piece 400, except that the shape of separator piece 600 is an X, or a plus sign, and each beam of separator piece 600 can be approximately 1.00 mm wide and approximately 1.00 mm high. However, these numbers can vary as design constraints and system requirements might dictate.

Figure 7:
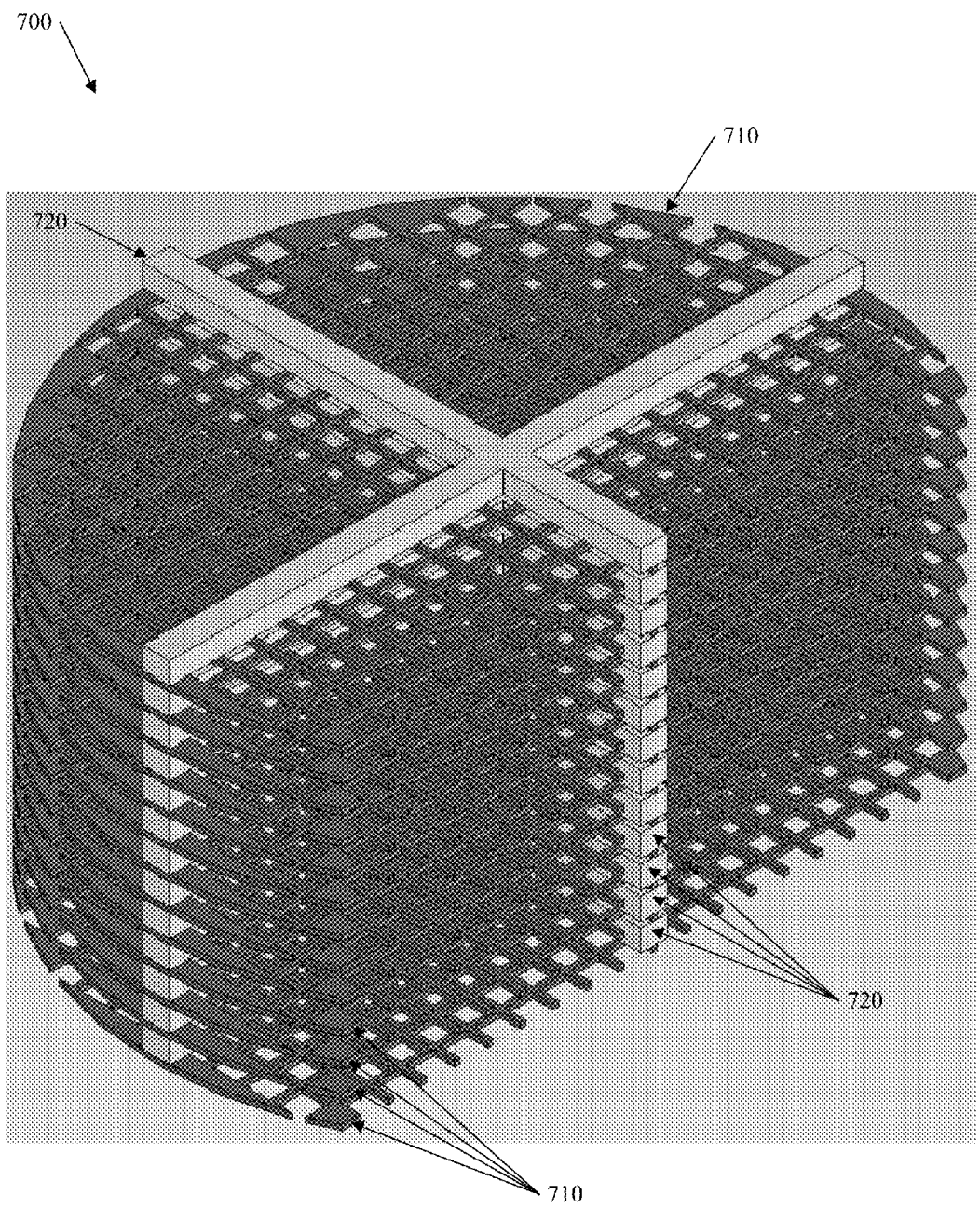
FIG. 7 illustrates an exemplary multi-layer media stack, showing multiple active wafer layers and multiple spacer or separator pieces according to certain embodiments.

FIG. 7 illustrates an exemplary multi-layer media stack 700, showing multiple active wafers 710 and multiple spacer or separator pieces 720 according to certain embodiments. As shown in FIG. 7, active wafers 710 can be similar to active wafer 200 and separator pieces 720 can be similar to separator piece 400. Media stack 700 can be used, as is, and installed directly into the reactor vessel as one stack. Or, each individual piece of media stack 700 can be loaded into the reactor vessel. Or, media stack 700 can be affixed together (not shown) and inserted as a unit into the reactor vessel.

Figure 8:
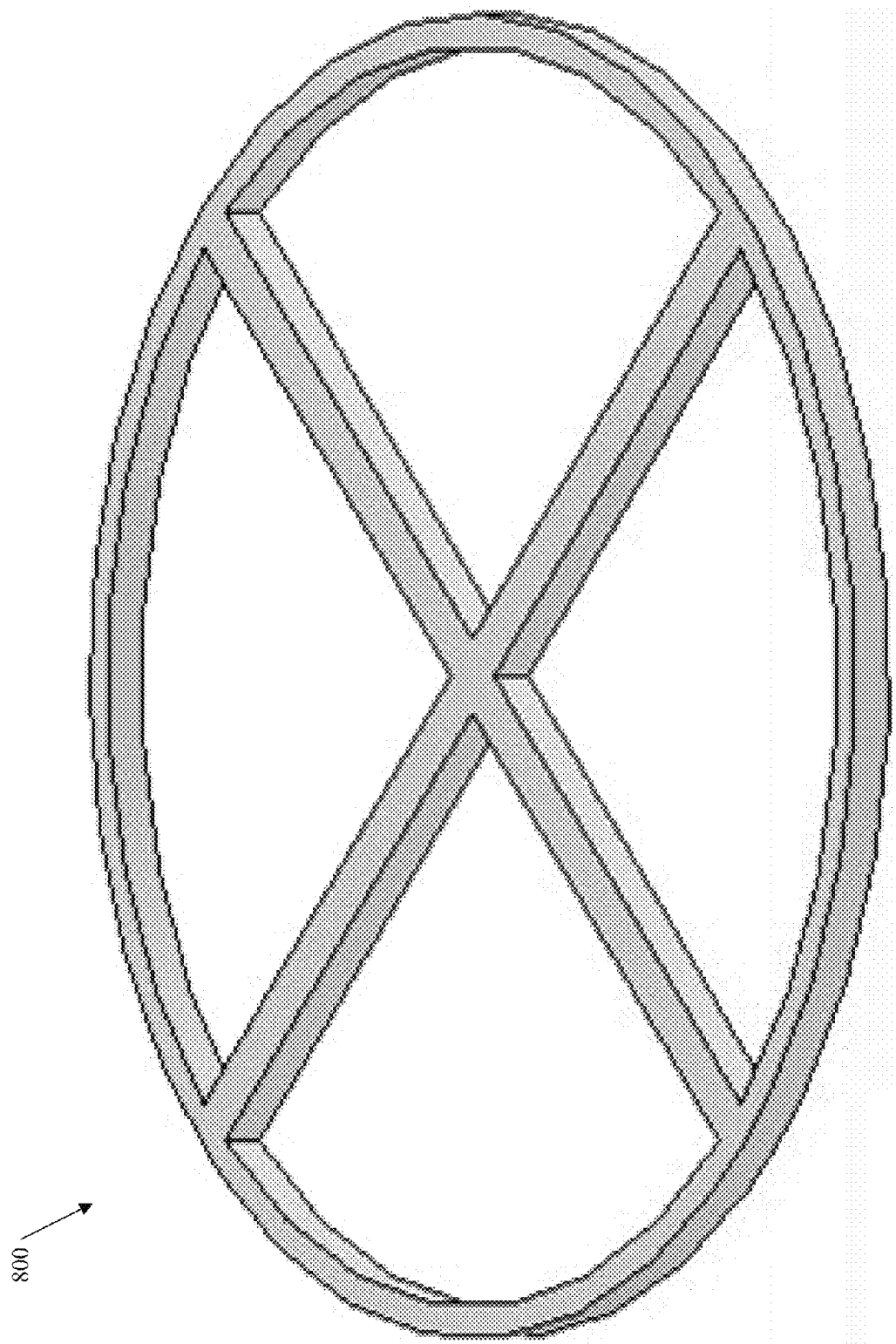
FIG. 8 illustrates an exemplary media spacer or separator piece according to certain embodiments.

FIG. 8 illustrates an exemplary media spacer or separator piece 800 according to certain embodiments. As shown in FIG. 8, separator piece 800 is similar in most every respect to separator piece 400, except that the shape of separator piece 800 is an X, or a plus sign, with a perimeter ring attached to the end point of each leg of the X, or plus sign. Each beam of separator piece 800 can be approximately 0.50 mm wide and approximately 2.00 mm high. However, these numbers can vary as design constraints and system requirements might dictate.

Figure 9:
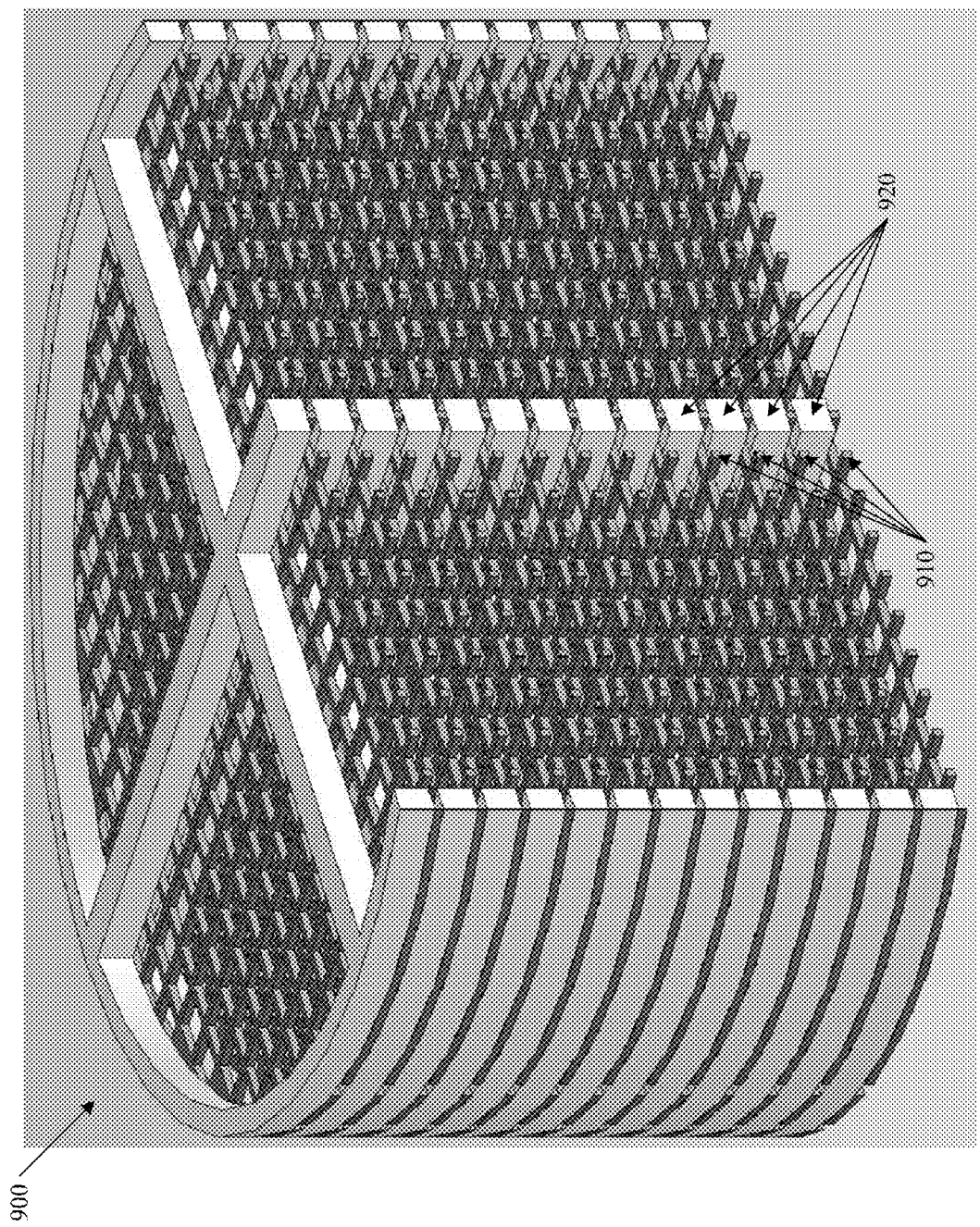
FIG. 9 illustrates an exemplary multi-layer media stack, showing multiple active wafer layers and multiple spacer or separator pieces according to certain embodiments.

FIG. 9 illustrates an exemplary multi-layer media stack 900, showing multiple active wafers 910 and multiple spacer or separator pieces 920 according to certain embodiments. As shown in FIG. 9, active wafers 910 can be similar to active wafer 200 and separator pieces 920 can be similar to separator piece 400. Media stack 900 can be used, as is, and installed directly into the reactor vessel as one stack. Or, each individual piece of media stack 900 can be loaded into the reactor vessel separately, creating the stack "in-situ." Or, media stack 900 can be affixed together (not shown) and inserted as a unit into the reactor vessel.

Figure 10:
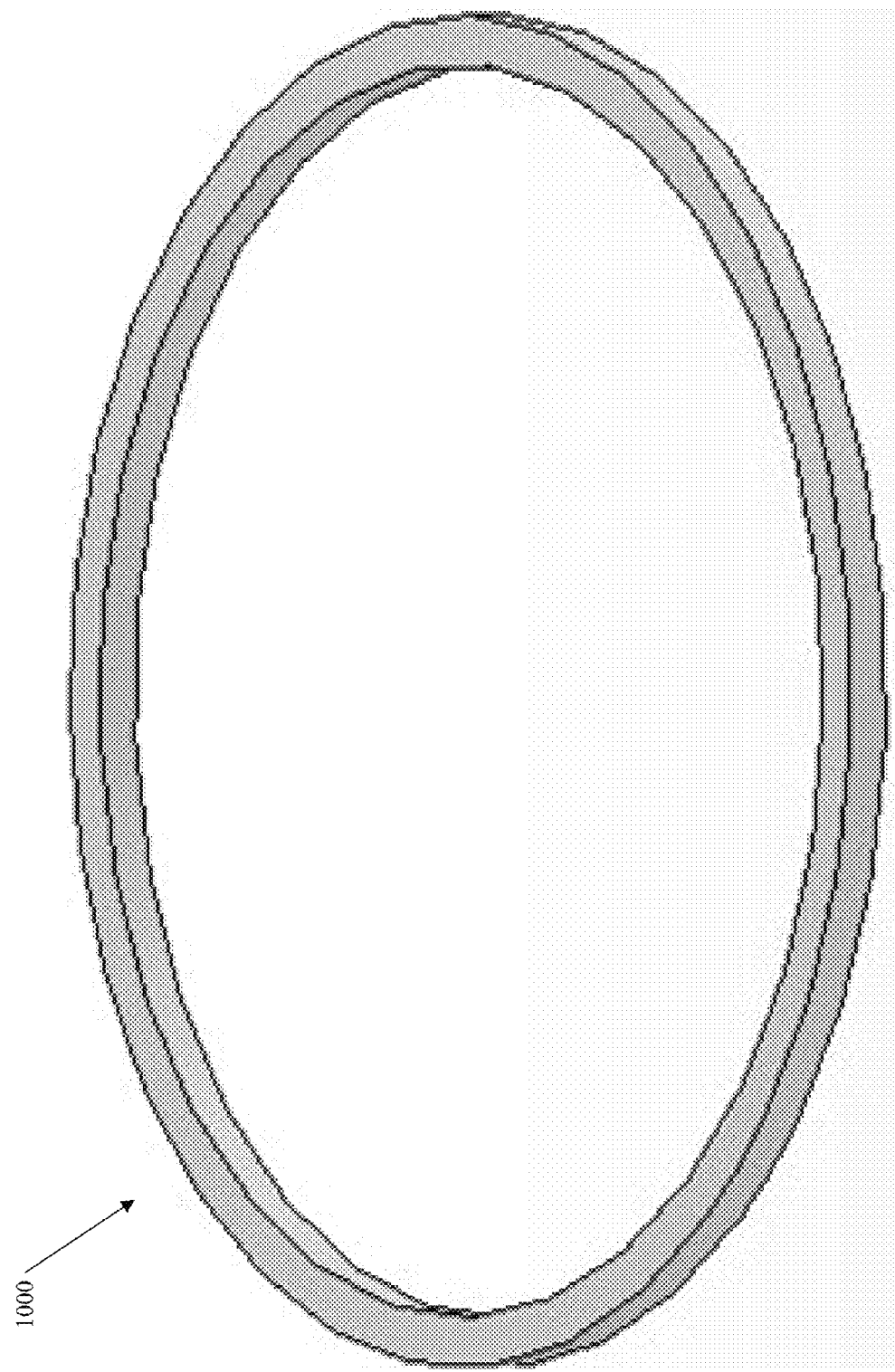
FIG. 10 illustrates an exemplary media spacer or separator piece according to certain embodiments.

FIG. 10 illustrates an exemplary media spacer or separator piece 1000 according to certain embodiments. As shown in FIG. 10, separator piece 1000 is similar in most every respect to separator piece 400, except that the shape of separator piece 1000 is a ring only, with no spokes, and the beam of separator piece 1000 can be approximately 1.00 mm wide and approximately 2.00 mm high. However, these numbers can vary as design constraints and system requirements might dictate.

Figure 11:
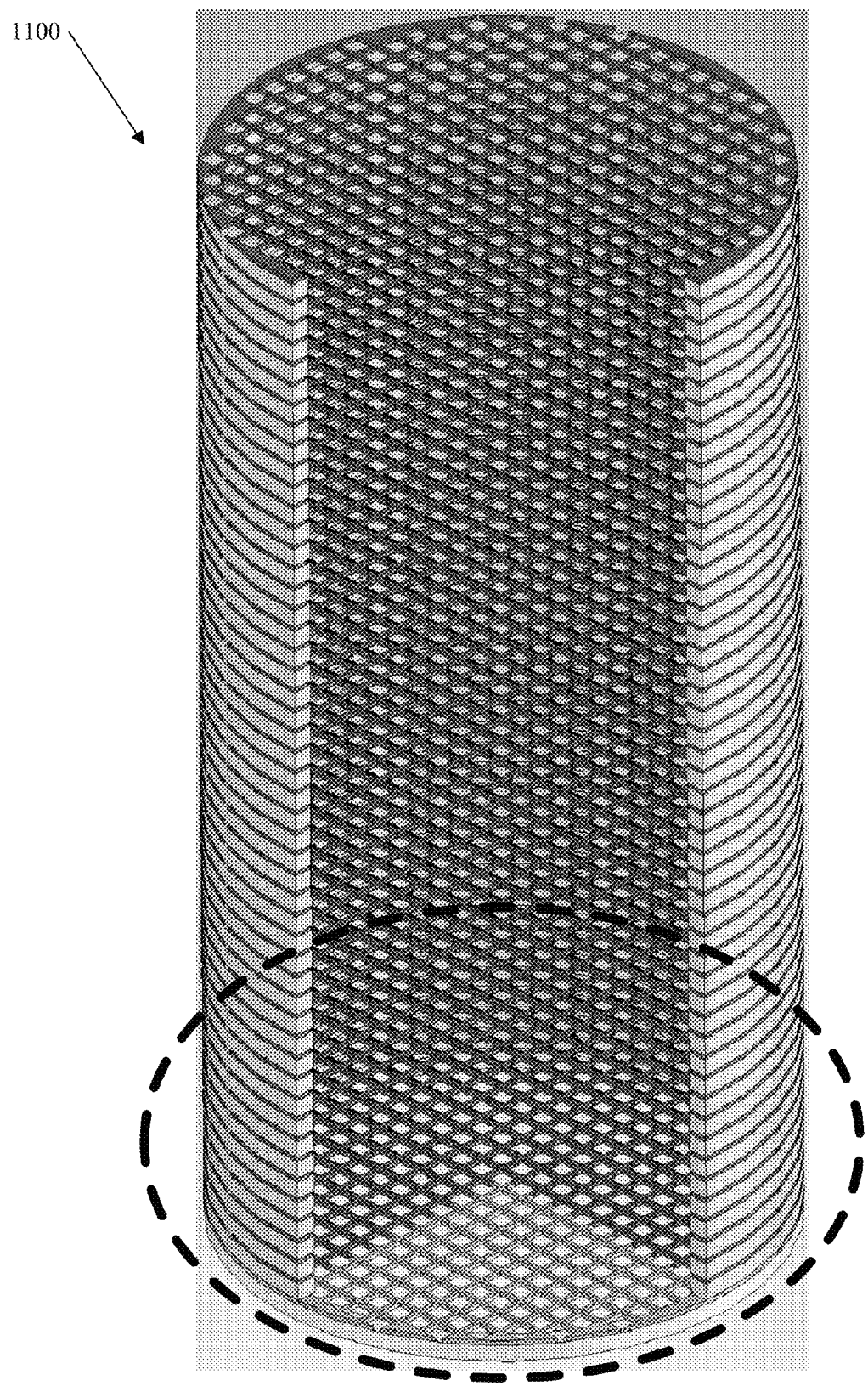
FIG. 11 illustrates an exemplary multi-layer media stack, showing multiple active wafer layers and multiple spacer or separator pieces according to certain embodiments.

FIG. 11 illustrates an exemplary multi-layer media stack 1100, showing multiple active wafer layers and multiple spacer or separator piece according to certain embodiments. The dashed circle at the base of FIG. 11 identifies the area of a zoomed-in view as shown in FIG. 12.

Figure 12:
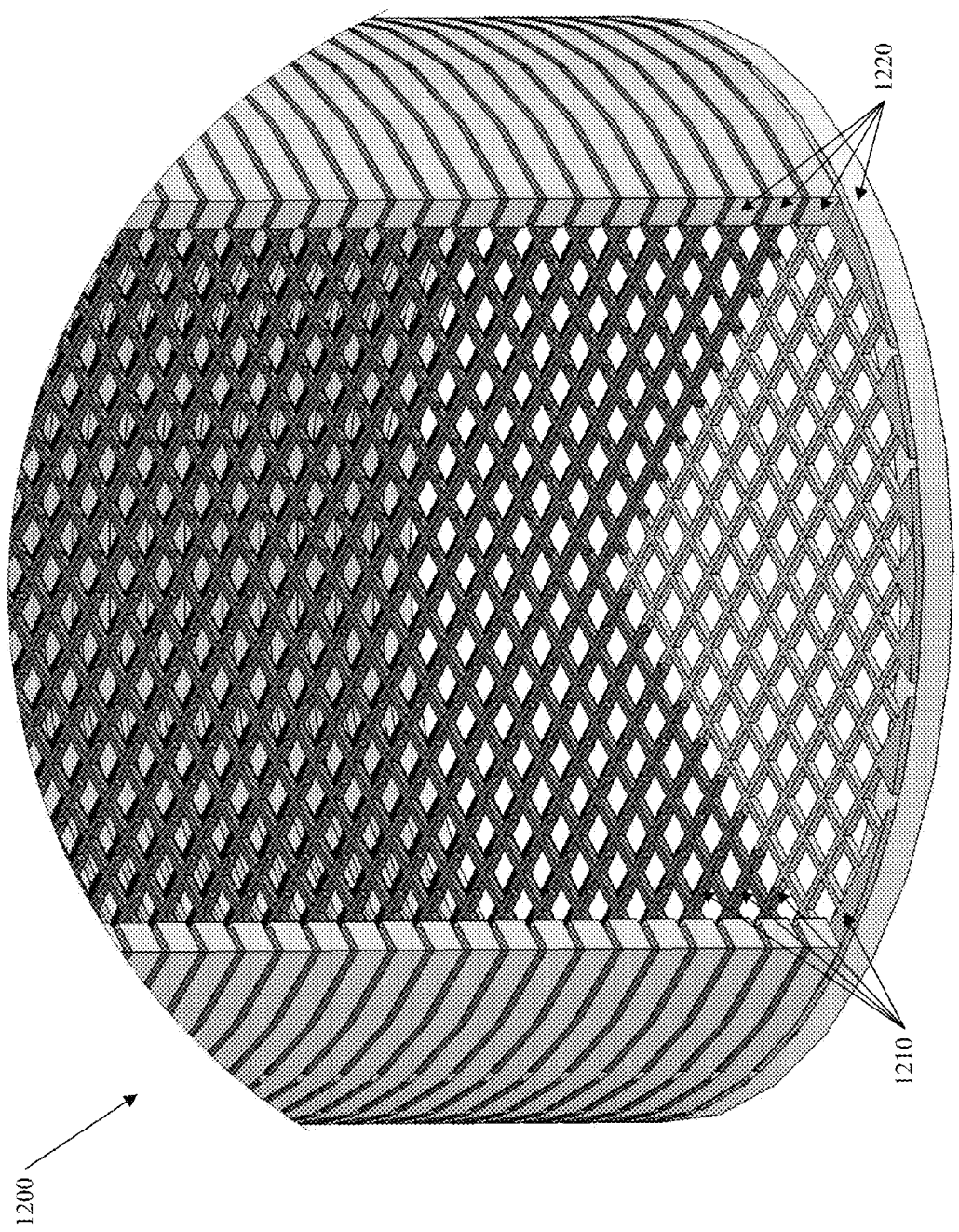
FIG. 12 illustrates a zoomed-in view of the exemplary multi-layer media stack of FIG. 10, showing multiple active wafer layers and multiple spacer or separator pieces according to certain embodiments.

FIG. 12 illustrates a zoomed-in view 1200 of the exemplary multi-layer media stack of FIG. 10, showing multiple active wafers 1210 and multiple spacer or separator pieces 1220 according to certain embodiments. As shown in FIG. 12, active wafers 1210 can be similar to active wafer 200 and separator pieces 1220 can be similar to separator piece 400. Media stack 1200 can be used, as is, and installed directly into the reactor vessel as one stack. Or, each individual piece of media stack 1200 can be loaded into the reactor vessel. Or, media stack 1200 can be affixed together (not shown) and inserted as a unit into the reactor vessel.

Figure 13:
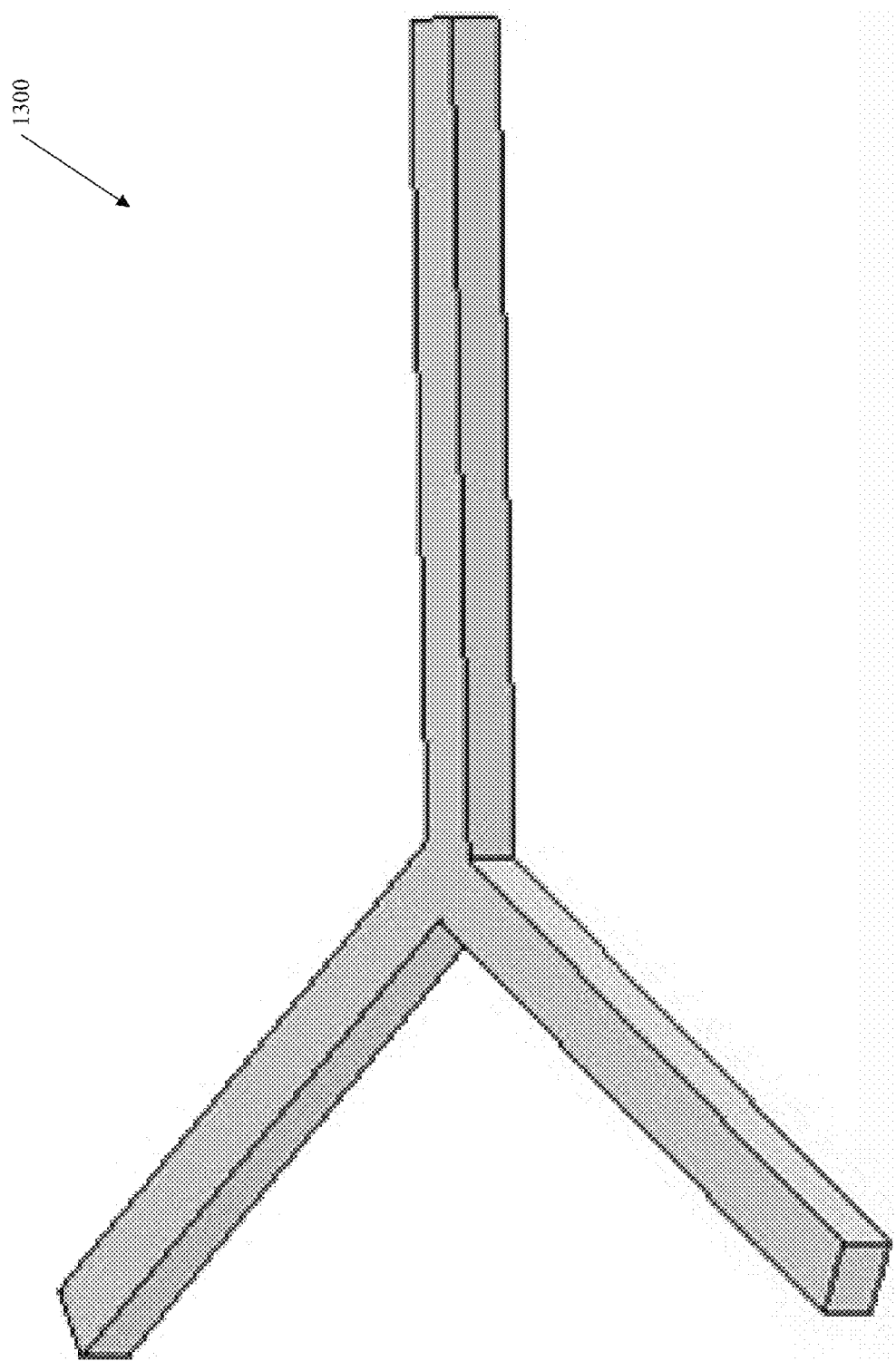
FIG. 13 illustrates an exemplary media spacer or separator piece according to certain embodiments.

FIG. 13 illustrates an exemplary media spacer or separator piece 1300 according to certain embodiments. As shown in FIG. 13, separator piece 1300 is similar in most every respect to separator piece 400, except that the shape of separator piece 1300 is a Y and each beam of separator piece 1300 can be approximately 0.10 mm wide and approximately 2.00 mm high. However, these numbers can vary as design constraints and system requirements might dictate.

As shown in the Figures of this application, the shape of the spacer or separator pieces can be almost anything, too many to include all of them in this application. Additionally, the Figures in this application tend to illustrate an alternating media layer/separator piece configuration, which is not meant to require such alternating configurations. There can be multiple media layers between each separator piece and/or multiple separator pieces between each media layer and/or multiple media layers between multiple separator pieces. Also, more than one type of media and/or more than one type of separator piece can be used within a given media stack. Such variation is intended to be within the scope of this application. So long as the media and the spacer or separator pieces facilitate the immobilization of particles in the reactor vessel, they can be used. To do this facilitation, the separator pieces should be non-ferromagnetic; they should not (or minimally) negatively impact the acceptable flow dynamics of the processing fluid passing through the wafers within the reactor vessel.

Figure 14:
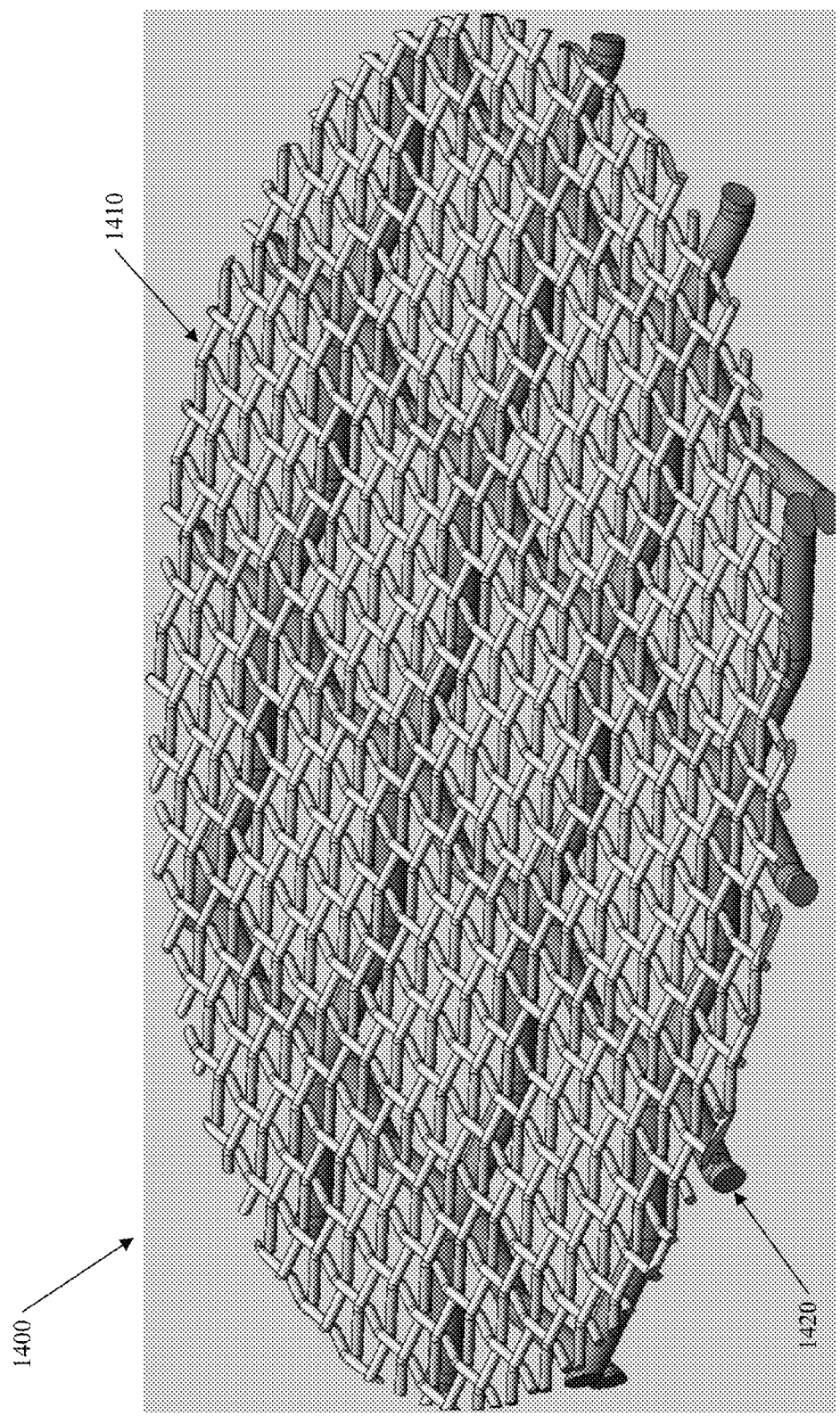
FIG. 14 illustrates an exemplary media stack, showing one active wafer layer and one spacer or separator piece according to certain embodiments.

FIG. 14 illustrates an exemplary media stack 1400, showing one active wafer 1410 layer and one spacer or separator piece 1420 layer according to certain embodiments. The basic active wafer materials and sizes have been discussed elsewhere within this application and are generally applicable to active wafer 1410 and separator piece 1420. However, in certain embodiments, the ferromagnetic material can take the form of woven strands or wires, i.e., ferromagnetic strands (FMSs). The FMSs can be cut-to-length and placed in service within the reactor vessel, oriented such that each strand is orthogonal or nearly orthogonal to the flow-stream of the process fluid moving through the reactor vessel. In certain embodiments, a cylindrical reactor is configured for continuous axial-flow, wherein the FMSs lie roughly in planes that are orthogonal to the axis of the cylindrical wall of the reactor vessel.

In certain embodiments, as in FIG. 14, a multiplicity of these strands can be pre-fashioned into a mesh to form a ferromagnetic mesh (FMM), which can be shaped into active wafer 1410. The thickness in diameter of each strand of the mesh, the type of weave of the mesh, the orientation of each strand to the other strands of the mesh, the density or scarcity of the strands of the mesh, and so on are all variables that depend on the design constraints of each system. These design constraints can include the composition of the particulate material (e.g., a catalyst) being immobilized, the flow rate of the particular material, the particle-size of the particles being immobilized, the size distribution of the particles being immobilized, the area of each active wafer, the distance between active wafers (e.g., the thickness of each spacer or separator piece, as disclosed elsewhere herein), the magnetic coil-field strength which will be used in the reactor vessel, and so on. However, active wafer 1410 is a shown to be a plain weave, where each strand is no larger than approximately 0.05 mm in diameter and two adjacent and parallel strands are spaced no greater than approximately 5.00 mm apart from each other. Of course, larger diameter strands can be used, as well as greater wire-spacing.

In certain embodiments, as in FIG. 14, separator piece 1420 may be a shaped, woven mesh as with active wafer 1410, except that it can be non-ferromagnetic. To facilitate separation of the active wafers and maintain appropriate process fluid flow, it can be made of thicker strands, and it can be a more open weave. As with active wafer 1410, the thickness in diameter of each strand of the mesh, the type of weave of the mesh, the orientation of each strand to the other strands of the mesh, the density or scarcity of the strands of the mesh, and so on are all variables that depend on the design constraints of each system. For example, separator piece 1420 is a shown to be a plain weave, where each strand is up to approximately 4.00 mm in diameter and two adjacent and parallel strands are spaced approximately 30.00 mm apart from each other.

Figure 15:
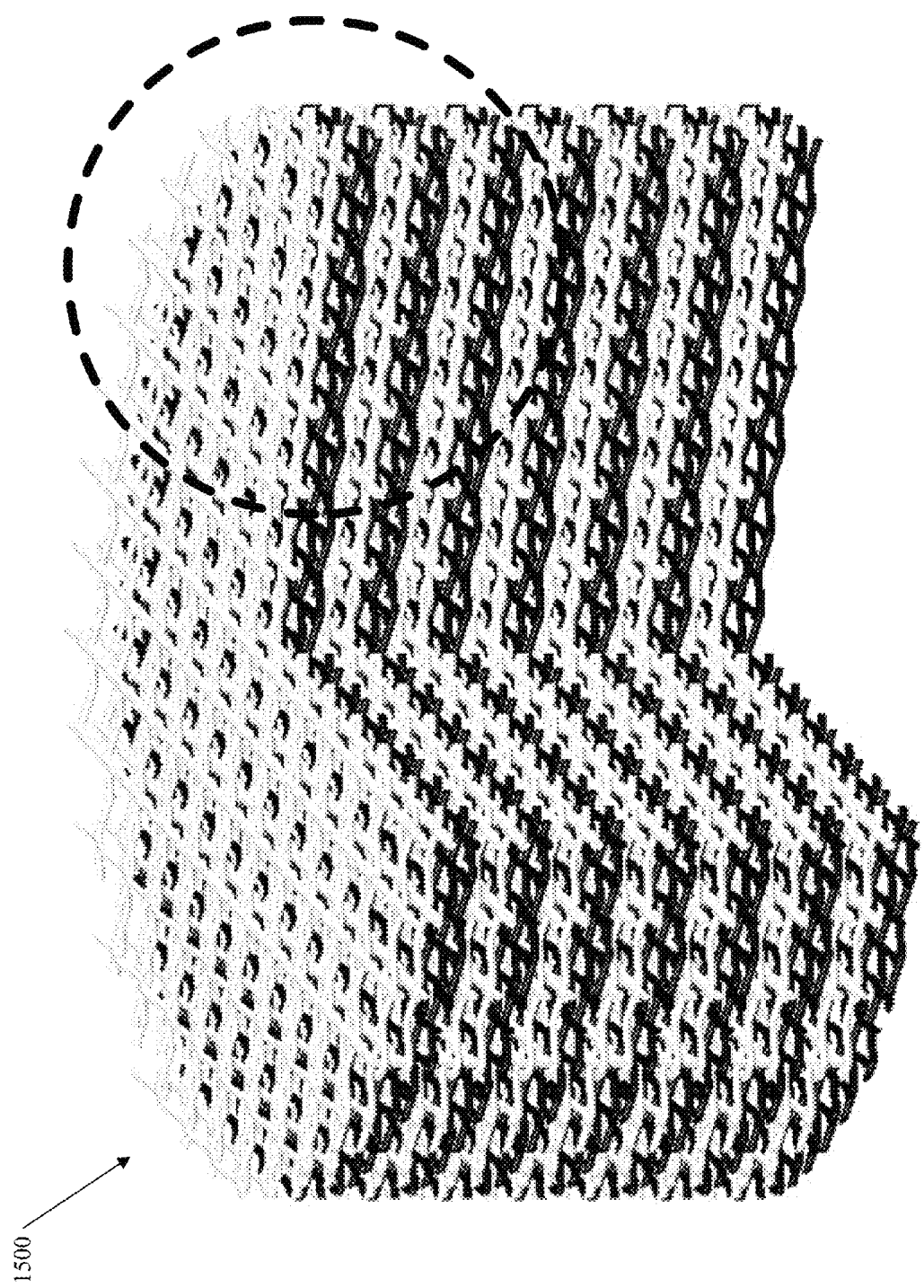
FIG. 15 illustrates an exemplary multi-layer media stack, showing multiple active wafer layers and multiple spacer or separator piece according to certain embodiments.

FIG. 15 illustrates an exemplary multi-layer media stack 1500, showing multiple active wafer layers and multiple spacer or separator pieces according to certain embodiments. The dashed circle at the base of FIG. 15 identifies the area of a zoomed-in view as shown in FIG. 16.

Figure 16:
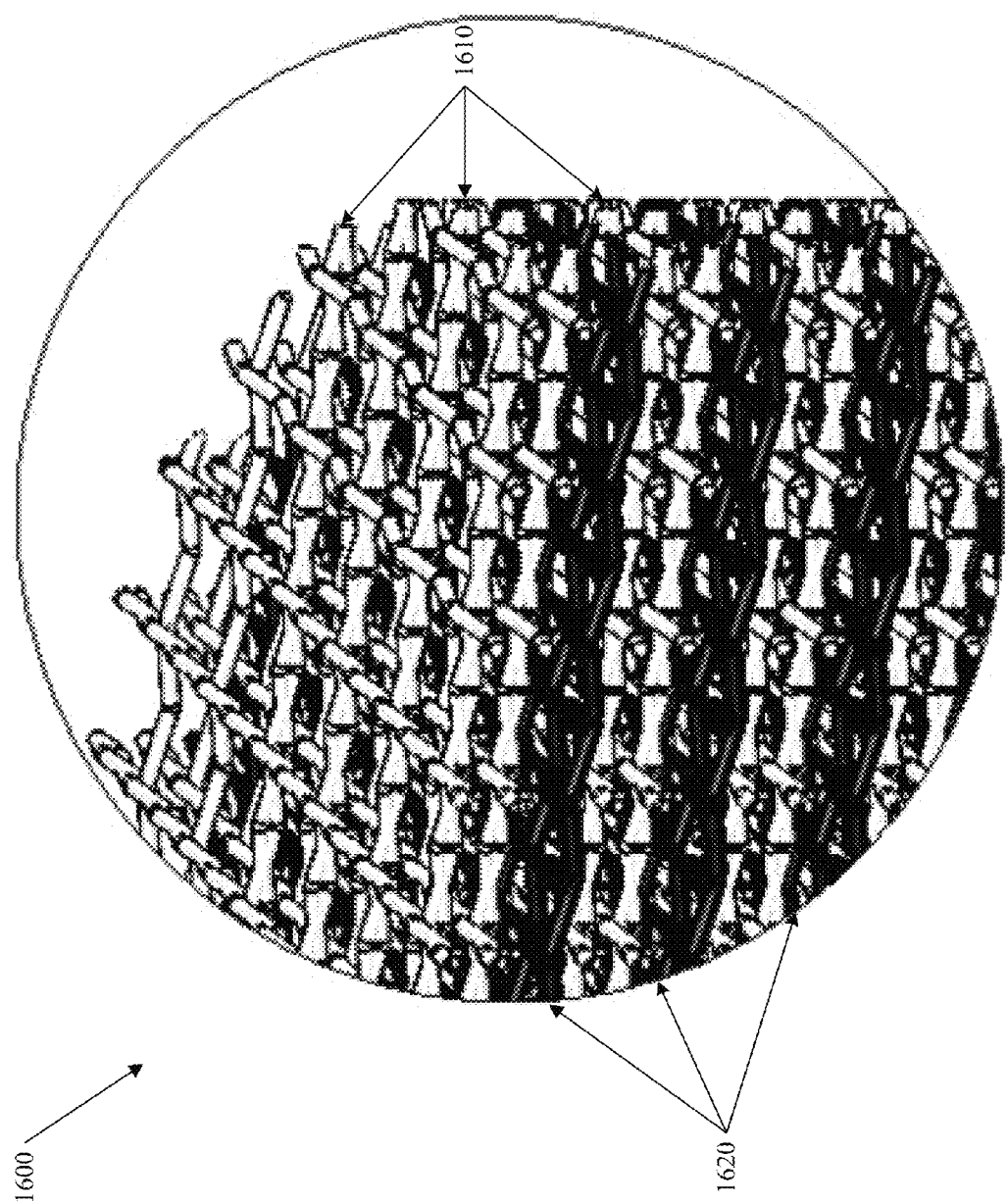
FIG. 16 illustrates a zoomed-in view of the exemplary multi-layer media stack of FIG. 15, showing multiple active wafer layers and multiple spacer or separator pieces according to certain embodiments.
Figure 17:
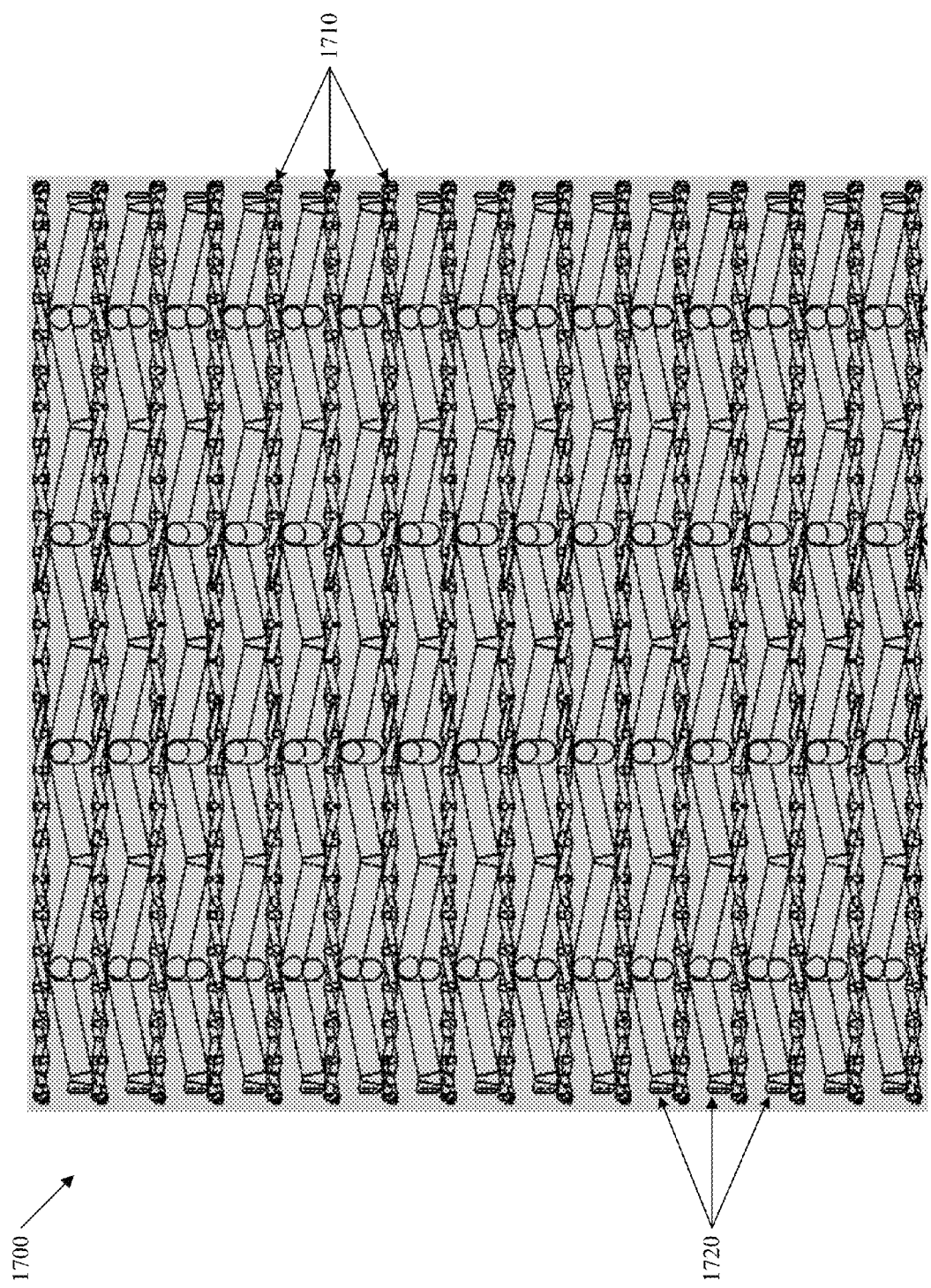
FIG. 17 illustrates a straight-on, side view of the exemplary multi-layer media stack of FIG. 15, showing multiple active wafer layers and multiple spacer or separator pieces according to certain embodiments.

FIG. 16 illustrates a zoomed-in view 1600 of the exemplary multi-layer media stack of FIG. 15, showing multiple active wafers 1610 and multiple spacer or separator pieces 1620 according to certain embodiments. As shown in FIG. 16, active wafers 1610 can be similar to active wafer 1410 and separator pieces 1620 can be similar to separator piece 1420. Media stack 1600 can be used, as is, and installed directly into the reactor vessel as one stack. Or, each individual piece of media stack 1600 can be loaded into the reactor vessel. Or, media stack 1600 can be affixed together (not shown) and inserted as a unit into the reactor vessel. FIG. 17 illustrates a straight-on, side view 1700 of the exemplary multi-layer media stack of FIG. 15, showing multiple active wafers 1710 and multiple spacer or separator pieces 1720 according to certain embodiments.

In certain embodiments, active wafers can be stacked-up within the reactor vessel, not directly atop one-another, but rather employing some means within the vessel of creating spaces between each of the active wafers. In certain embodiments, the spaces can be created in any way that meets the following criteria: the spacers do not occupy a large % of the available cross-sectional area of the reactor vessel, which allows for volume in which to immobilize the particles and assures that the fluid-flow will not be significantly impeded; they allow the fluid flow to remain roughly radially symmetrical within the reactor vessel; and they are not ferromagnetic.

Finally, in certain embodiments, the separator pieces may be eliminated by creating legs on the active wafers. For example, a manufacturing process could be used to create vertical legs on each active wafer to space them out when stacked, thereby eliminating the need for the separator pieces. In this situation, either the leg(s) could be be non-ferromagnetic, or, if made from the same ferromagnetic material as the active wafer, the leg(s) would be very thin so as to not allow the majority of the flux lines to flow up through them (even though they would carry some flux, they would reach saturation at a low percentage of the total flux, and thus not significantly reduce immobilization performance). Thus, most of the flux would have to jump between wafers, which would help facilitate particle immobilization. In either leg situation, the legged wafers may be made with a keying means such that the legs of one wafer, when stacked, match up to the leg supports of the wafer beneath it. Alternatively, the legs of each wafer can be made with an appropriate length and at least partially hollow, such that the legs of one wafer, when stacked, fit inside the at least partially-hollow legs of the wafer beneath it.

In certain embodiments, the strands which make up the mesh active and/or passive spacer(s)/wafer(s) disclosed herein can be hollow, such that they can be configured to conduct heat transfer fluids (e.g., liquids, gasses, etc.) throughout the length of the HENSI column as well as to immobilize catalytic particles on their exterior, and thus effect 'in-situ' heat transfer to/from the reaction zone during the reaction. These hollow tubes can be of whatever shape cross-section is desired to meet one or more of the design purposes and/or constraints the system and/or sytem designer may desire. For example, the hollow tubes could have a substantially cylindrical outside cross-section and a substantially cylindrical inside (i.e., the hollow area) cross-section. In this example, the wall thickness of the hollow tube (i.e., the difference between the inside and outside diameters of the cross-section) can be designed, as a function of the material being used, as needed to withstand the pressure and flow of the heat transfer fluid that is moving through the hollow tube. A simple heat transfer pump may be used to move the heat transfer fluid through the hollow tube. The hollow tube can be one, continuous piece of material on a per-wafer/separator basis, or it can be multiple pieces of material on a per-wafer/separator bases, or it can be one piece of material that traverses multiple wafers/separators, or it can be one piece of material that traverses all wafers/separators in the reactor. Multiple, individual pieces of hollow tubes can be daisy-chained outside the reaction zone to help reduce the number of heat transfer pumps needed, and perhap reducing that number to one. Finally, instead of hollow tube material making up a mesh wafer/spacer, the wafer can be a planar material that has been hollowed-out or that is made up of two or more pieces fused together to form one or more hollow internal passages.

Conclusions

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

What is claimed is:

1. An apparatus for immobilizing particles in a reactor vessel, comprising:
a plurality of active wafers, each active wafer including ferromagnetic material and having a wafer magnetic permeability; and
a plurality of separator pieces, each separator piece including non-ferromagnetic material, wherein:
the plurality of active wafers and the plurality of separator pieces are coupled in a planar alternating manner to form a media stack, the media stack being physically permeable to a magnetic-particle-containing fluid having a fluid magnetic permeability that is low relative to the wafer magnetic permeability; and
the media stack, when physically permeated by the fluid and magnetically permeated by a magnetic field, captures at least some of the magnetic particles between at least two of the plurality of active wafers creating a plurality of magnetic particle bridges between the at least two of the plurality of active wafers.

2. The apparatus of claim 1, wherein the ferromagnetic material is selected from a group of ferromagnetic material, the group of ferromagnetic material including: steel, cobalt, iron, nickel, chromium oxides, ferrite, Heusler alloys, and 400-series stainless steel.

3. The apparatus of claim 1, wherein each of the plurality of active wafers has a wafer thickness and a wafer shape having a wafer area.

4. The apparatus of claim 3, wherein the wafer shape is selected from a group of wafer shapes, the group of wafer shapes including: a circle, a square, a rectangle, a trapezoid, a parallelogram, a polygon, a rhombus, a cone, a hemisphere or a pyramid.

5. The apparatus of claim 3, wherein the wafer thickness is less than a separator piece thickness.

6. The apparatus of claim 5, wherein the wafer thickness is between approximately 0.0001 millimeters (mm) and approximately 20.00 mm.

7. The apparatus of claim 3, wherein the wafer shape is approximately equal to a separator piece shape.

8. The apparatus of claim 7, wherein the wafer area is approximately equal to a separator piece area.

9. The apparatus of claim 8, wherein the wafer shape is approximately a circle and the wafer area is between approximately 0.10 square centimeters ($cm^2$) and approximately 10000.00 $cm^2$.

10. The apparatus of claim 1, wherein the non-ferromagnetic material is selected from a group of non-ferromagnetic material, the group of non-ferromagnetic material including: non-magnetic metals, plastics, ceramics, glass, fiberglass, and wood.

11. The apparatus of claim 1, wherein each of the plurality of separator pieces has a separator piece thickness and a separator piece shape having a separator piece area.

12. The apparatus of claim 11, wherein the separator piece shape is selected from a group of separator piece shapes, the group of separator piece shapes including: a three-legged star, a Y-shape, a cross, a multi-legged star, a circle, a square, a rectangle, a trapezoid, a parallelogram, a polygon, a rhombus, a cone, a hemisphere or a pyramid.

13. The apparatus of claim 11, wherein the separator piece thickness is between approximately 0.001 millimeters (mm) and approximately 100.00 mm.

14. The apparatus of claim 11, wherein the separator piece shape is approximately a circle and the separator piece area is between approximately 0.10 square centimeters ($cm^2$) and approximately 10000.00 $cm^2$.

15. An apparatus for immobilizing particles in a reactor vessel, comprising:
a plurality of active wafers, each active wafer including ferromagnetic material and having a wafer magnetic permeability,
wherein:
the plurality of active wafers are coupled in a planar manner to form a media stack, the media stack being physically permeable to a magnetic-particle-containing fluid having a fluid magnetic permeability that is low relative to the wafer magnetic permeability;
each of the plurality of active wafers includes at least one wafer leg, the at least one wafer leg including non-ferromagnetic material and providing separation between the coupled plurality of active wafers; and
the media stack, when physically permeated by the fluid and magnetically permeated by a magnetic field, captures at least some of the magnetic particles between at least two of the plurality of active wafers creating a plurality of magnetic particle bridges between the at least two of the plurality of active wafers.

16. The apparatus of claim 15, wherein the ferromagnetic material is selected from a group of ferromagnetic material, the group of ferromagnetic material including: steel, cobalt, iron, nickel, chromium oxides, ferrite, Heusler alloys, and 400-series stainless steel.

17. The apparatus of claim 15, wherein each of the plurality of active wafers has a wafer thickness and a wafer shape having a wafer area.

18. The apparatus of claim 17, wherein the wafer shape is selected from a group of wafer shapes, the group of wafer shapes including: a circle, a square, a rectangle, a trapezoid, a parallelogram, a polygon, a rhombus, a cone, a hemisphere or a pyramid.

19. The apparatus of claim 17, wherein the wafer thickness is between approximately 0.0001 millimeters (mm) and approximately 20.00 mm.

20. The apparatus of claim 17, wherein the wafer shape is approximately a circle and the wafer area is between approximately 0.10 square centimeters ($cm^2$) and approximately 10000.00 $cm^2$.

21. The apparatus of claim 15, wherein the non-ferromagnetic material is selected from a group of non-ferromagnetic material, the group of non-ferromagnetic material including: non-magnetic metals, plastics, ceramics, glass, fiberglass, and wood.

22. The apparatus of claim 15, wherein the at least one wafer leg has a leg length.

23. The apparatus of claim 22, wherein the leg length is between approximately 0.001 millimeters (mm) and approximately 100.00 mm.

\* \* \* \* \*